Aug. 28, 1962 H. SPANNAGEL ET AL 3,051,271

DISK BRAKE

Filed May 16, 1960 2 Sheets-Sheet 1

INVENTORS
Hans SPANNAGEL
Nikolaus von RUECKER

BY Dicke, Craig & Freudenberg
ATTORNEYS

Aug. 28, 1962 H. SPANNAGEL ET AL 3,051,271

DISK BRAKE

Filed May 16, 1960 2 Sheets-Sheet 2

INVENTORS
Hans SPANNAGEL
Nikolaus von RUECKER

BY Dicke, Craig & Freudenberg
ATTORNEYS

United States Patent Office 3,051,271
Patented Aug. 28, 1962

3,051,271
DISK BRAKE

Hans Spannagel, Wilferdingen, Kreis Pforzheim, and Nikolaus von Ruecker, Stuttgart, Germany, assignors to Dr. Ing. h.c. F. Porsche K.G., Stuttgart-Zuffenhausen, Germany Filed May 16, 1960, Ser. No. 29,517
Claims priority, application Germany May 30, 1959
7 Claims. (Cl. 188—18)

Figure 1:
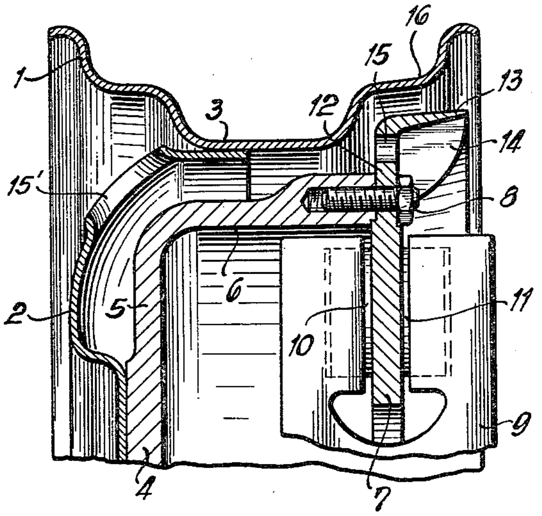

The present invention relates to a disk brake for vehicles, especially motor vehicles, which is provided with an internally-gripped or internally-surrounded brake-disk that is secured at a support member.

The internally-gripped or surrounded disk brake, especially partial disk brake, offers, in principle, in comparison with the outwardly-gripped or externally surrounded partial disk brake the advantage of possessing a greater brake disk diameter and therefore producing larger braking moments for the same braking forces. However, the known constructions of this type entail the disadvantage that the form-rigidity of the flat, internally-gripped or surrounded disk is less than that of the externally-gripped or surrounded disk. Consequently, the internally surrounded disk has not received general acceptance in the art to date predominantly for that reason, notwithstanding the advantages obtainable thereby.

This disadvantage is eliminated in accordance with the present invention by imparting to the support member for the brake disk an essentially drum-shaped form, to the rim of which the brake disk is detachably secured. The use of such an arrangement enables achieving a construction in which the brake disk is secured at many points on a rigid disk-support member to which is imparted by reason of the particular shape in accordance with the present invention a relatively high, inherent rigidity. A favorable location of the disk in the cooling air stream of the vehicle as well as simultaneously therewith an optimum rigid support of the disk is achieved, in particular, by an arrangement in which the rim of the disk support member has at least the width of the drop center rim of the wheel rim of felly surrounding the same. The rim of the disk support is thereby preferably constructed as a brake drum and serves for accommodating a manual brake. Additionally, the rim of the disk support is provided along the periphery thereof with apertures which enable or facilitate the accessibility to the brake shoes.

By arranging the brake disk, representing itself, a relatively small mass, at the support in the form of a separate structural part, the brake disk is excessively heated during braking in the prior art constructions so that rapidly a deterioration of the braking effect takes place. This is obviated according to the present invention by providing the brake disk with rim portons which extend beyond the fastening or securing area of the disk at the support. As a result of such an arrangement, not only an enlargement of the mass of the brake disk favorable to the distribution of the heat produced by friction is achieved but simultaneously therewith the surface of the disk determining the removal or conduction of the braking heat is effectively increased thereby. Additionally, the rigidity of the disk is influenced favorably which is increased by the provision of a collar-shaped projection arranged at the rim part of the disk.

The rim portions of the brake disk according to the present invention may be used preferably for the accommodation of a number of apertures for the passage therethrough of cooling air whereby these apertures are arranged in direct proximity to the disk extension. For purposes of intensifying the flow of the cooling air, the rim portions of the brake disk are provided with cooling fins which may possibly be constructed as blower blades. The cooling fins or ribs preferably together with the extension are arranged as a separate part at the brake disk. Furthermore, it is possible and eventually also advantageous if the collar-shaped extension serves as braking surface for a hand brake.

Accordingly, it is an object of the present invention to provide a brake disk construction for a disk brake of a vehicle which obviates the deficiencies and shortcomings of the prior art constructions.

Another object of the present invention is the provision of a disk brake construction which offers all the advantages obtainable with the internally-gripped or surrounded brake disk while avoiding the disadvantages normally encountered with the externally-gripped or surrounded brake disks.

A further object of the present invention resides in the provision of a disk brake construction in which the individual parts effectively possess a greater inherent rigidity by the particular shape and support thereof.

Still another object of the present invention resides in the provision of a brake disk which offers improved rigidity and stability as compared to the prior art devices.

Another object of the present invention resides in the provision of a disk brake construction in which an extremely favorable location of the disk within the cooling air flow of the vehicle as well as an optimum rigidity of the disk itself is obtained by simple means and by a relatively inexpensive construction.

Still a further object of the present invention resides in the provision of a disk brake construction in which excessive heating during braking is effectively avoided or minimized by increasing the effective surfaces from which the heat may be conducted away.

Figure 2:
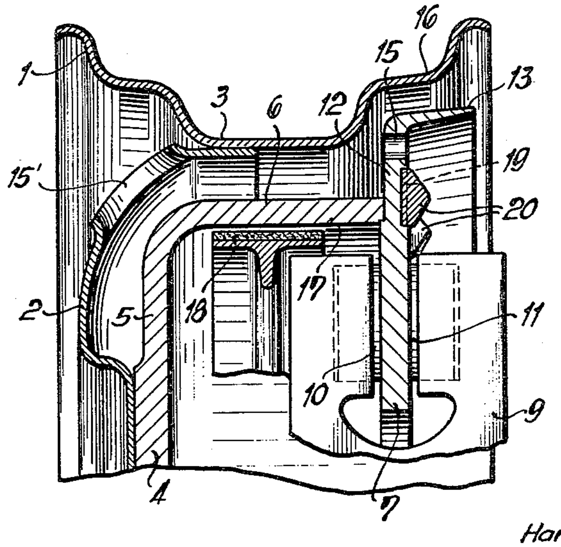
Figure 3:
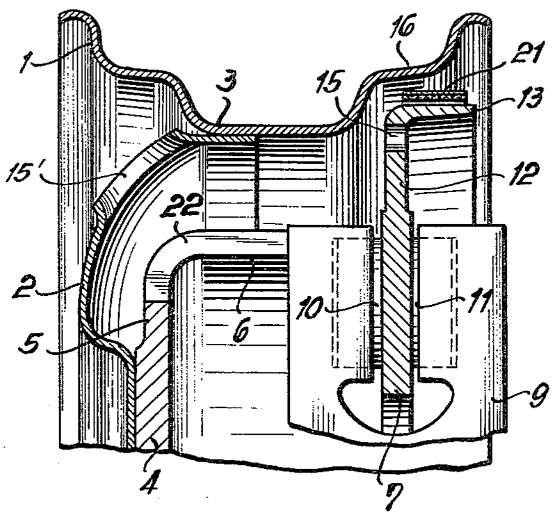

These and other objects, features and advantages of the present invention will become more obvious from the following description when taken in connection with the accompanying drawing which shows, for purposes of illustration only, three embodiments in accordance with the present invention, and wherein FIGURE 1 is a partial cross-sectional view through a first embodiment of a brake disk construction in accordance with the present invention, FIGURE 2 is a partial cross-sectional view through a second embodiment of a brake disk construction in accordance with the present invention, and FIGURE 3 is a partial cross-sectional view through a third embodiment of a disk brake construction in accordance with the present invention.

Referring now to the drawing wherein like reference numerals are used throughout the various views to designate like parts, reference numeral 1 designates the wheel felly or rim of a wheel of a motor vehicle. A wheel dish 2 is suitably arranged, in any known manner, at the felly or rim 1 of the motor vehicle, for example, the wheel dish 2 is secured by welding at the drop center 3 of the felly 1. The wheel dish 2 is also connected in any suitable manner with a cast body 4 which also forms, inter alia, the wheel hub (not illustrated in the drawing) and is provided with a disk portion 5 having a rim portion 6 adjoining the disk portion 5. A disk rim 7 is secured at the rim portion 6 in any suitable manner, for example, by means by bolts 8. The brake cylinders 10 and 11 suitably supported in a support member 9 within the rim portion 6 act on the disk 7 on both sides thereof. The cylinders 10 and 11 are provided with suitable pistons and are actuated by any known brake actuating device.

The brake disk 7 is provided according to the present invention with rim portions or with an extension 12 which extend outwardly beyond the region of the fastening of the disk 7 at the rim portion 6 by means of bolt members 8. The rim portions or extensions 12 of the disk may be provided along the entire periphery of the disk 7 or may also consist exclusively of individual sectors.

A collar-shaped projection 13 is arranged along the free end of the extension 12 which collar-shaped projection 13 extends essentially perpendicularly to the extension 12 and serves for purposes of reinforcing the rigidity of the disk 7. At the same time, the projection 13 serves as boundary and support for a plurality of ribs or fins 14 which are preferably distributed evenly along the periphery of the disk 7 and are possibly also curved in a blade-like manner.

A plurality of apertures 15 are provided in direct proximity to the projection 13 within the extension 12 of the disk 7. Apertures 15′ are also provided within the wheel dish 2 so that during rotation of the wheel cooling air is supplied by the fins 14 through the apertures 15 and 15′ along the rim portion 6.

In order to enable as wide as possible an extension 12 of the brake disk 7, the rim portion 6 of the cast part 4 which is effective in its entirety as support member for the brake disk 7 is so constructed that the rim portion 6 bridges the width of the drop center 3 of the wheel rim or felly 1 and the disk 7 thereby effectively comes within the area of the rim shoulder 16. By the use of such a construction it is possible, on the one hand, to provide a disk 7 having a relatively large diameter and therewith a disk extension 12 with optimum width. On the other, the disk 7 is effectively displaced into the air stream produced during drive of the vehicle which produces an additional cooling effect.

FIGURE 2 illustrates a second embodiment of the present invention in which those parts corresponding to those of FIGURE 1 are designated with the same reference numerals. In the embodiment of FIGURE 2, the rim portion 6 is provided with an internal brake surface 17 which cooperates with one or several brake shoes 18. The brake shoes 18 thereby serve as a manually operated brake for the vehicle and are actuated by means of a known linkage not illustrated in the drawing.

In the construction of the embodiment of FIGURE 2, an annular member 19 is additionally provided which is arranged at the disk 7 essentially at the diametric distance corresponding to that of the securing bolt members 8. The annular member 19 is supported in a cut-out portion or groove of disk 7, suitably machined into disk 7 and is provided with fins 20 intermediate the securing bolt members 8 (not shown in FIGURE 2). The form-rigidity of the disk 7 as well as the conduction of heat through the fins 20 is further improved thereby by the particular arrangement of the embodiment of FIGURE 2.

According to the embodiment of FIGURE 3, the extension 12 adjoining the disk 7 is also provided with a projection 13 which serves as brake surface for a band brake 21. Furthermore, the rim portion 6 of the disk support member 4 is provided with a cut-out portion or aperture 22 for improving the accessibility to the cylinders 10 and 11 and/or to the support member 9 which aperture 22 has a dimension corresponding to the width of the support member 9. However, a number of such apertures 22 may also be provided in the rim portion 6 which correspond to the number of support members 9.

In the various embodiments, the projection 13 as well as the fins 14 are illustrated as being formed in one piece with the extensions 12 and/or with the disk 7 thereof. However, it is also possible and even also eventually advantageous if the cooling fins 14 are cast of light-weight metal onto the brake disk 7 consisting, for example, of gray cast iron. However, a construction is also within the purview of the present invention in which the cooling fins 14 together with or without the projection 13 are arranged as a separate annular member which is secured at the disk 7 by means of bolt members, rivets or the like.

While we have shown and described several embodiments in accordance with the present invention, it is understood that the same is not limited thereto but is susceptible of many changes and modifications within the spirit and scope of the present invention. For example, the different features illustrated in the embodiments of FIGURES 1, 2 and 3 may also be interchanged among each other whereby corresponding structural changes are possible. Furthermore, it is within the purview of the structural modifications of the present invention to construct the manual hand brake either as shoe brake or as band brake.

Thus, it is quite obvious that the present invention is not limited to the details of the three embodiments, shown and described herein only for purposes of illustration, but is susceptible of many changes and modifications without departing from the spirit and scope of the present invention and we, therefore, do not wish to be limited to the details shown and described herein but intend to cover all such changes and modifications as are encompassed by the scope of the appended claims.

We claim:

1. A disk-brake construction for the wheel of a vehicle, especially of a motor vehicle, said wheel being provided with a felly having a drop-center portion, comprising an annular brake disk, main braking means for said disk surrounding said disk at the inner edge thereof, support means for said brake disk arranged within said felly, said support means having an essentially drum-like shape and including a disk portion and a rim portion secured thereto, said rim portion being of essentially annular configuration and having an axial length at least equal to that of said drop-center portion, and means detachably securing the brake disk to the rim portion of said support means at the end thereof opposite to said disk portion, said brake disk being provided with an annular extension which extends beyond the area of fastening of said brake disk to said support means outwardly of said support means, said extension having a collar-like projection secured to the rim portion thereof and extending substantially perpendicular to said brake disk adjacent said felly in the direction away from said supporting means, the diameter of said brake disk and extension thereon being larger than the diameter of said drop-center portion of said felly, said extension being provided with a plurality of apertures for the passage therethrough of cooling air, said apertures being provided adjacent to said projection between said means for detachably securing said brake disk to said support means and said projection.

2. A disk-brake construction according to claim 1, wherein said wheel is provided with a wheel dish secured to said felly, said wheel dish having a plurality of air inlet apertures provided therein, and wherein said extension is provided with cooling fins constructed in the shape of blower blades secured adjacent said apertures therein on the side of said brake disk opposite to said support means, so that during rotation of the wheel cooling air is supplied by the fins through the air inlet apertures in said wheel dish along said rim portion of the support means and through said apertures in said extension to provide for cooling of the disk-brake construction.

3. A disk-brake construction according to claim 1, wherein said rim portion is constructed as a brake drum and includes an internal brake surface, and further including a manually operated auxiliary brake acting against said surface.

4. A disk-brake construction according to claim 1, further including an annular member and a plurality of fins supported thereon, and wherein said annular member is secured to said brake disk on the side thereof opposite to said support means adjacent said apertures.

5. A disk-brake construction according to claim 1, wherein said rim portion of the support member is provided with a cut-out portion for providing accessibility to the interior of said drum-like support means.

6. A disk-brake construction according to claim 5, wherein said collar-shaped projection is provided with a brake surface at the exterior thereof, and further including a manually operated auxiliary brake acting against said surface.

7. A disk-brake construction according to claim 1, wherein said extension further includes cooling fins secured to the side thereof opposite said support means, said cooling fins being secured adjacent said apertures.

References Cited in the file of this patent

UNITED STATES PATENTS

| | | |
|---|---|---|
| 2,148,995 | Nelson | Feb. 28, 1939 |
| 2,331,259 | Whitten | Oct. 5, 1943 |
| 2,701,626 | Walther | Feb. 8, 1955 |

FOREIGN PATENTS

| | | |
|---|---|---|
| 205,682 | Australia | Jan. 16, 1957 |
| 1,169,939 | France | Sept. 15, 1958 |